March 7, 1939.  G. C. GUNDERSON  2,150,097
AUTOMATIC MOLDING APPARATUS
Filed Feb. 21, 1935   3 Sheets-Sheet 3
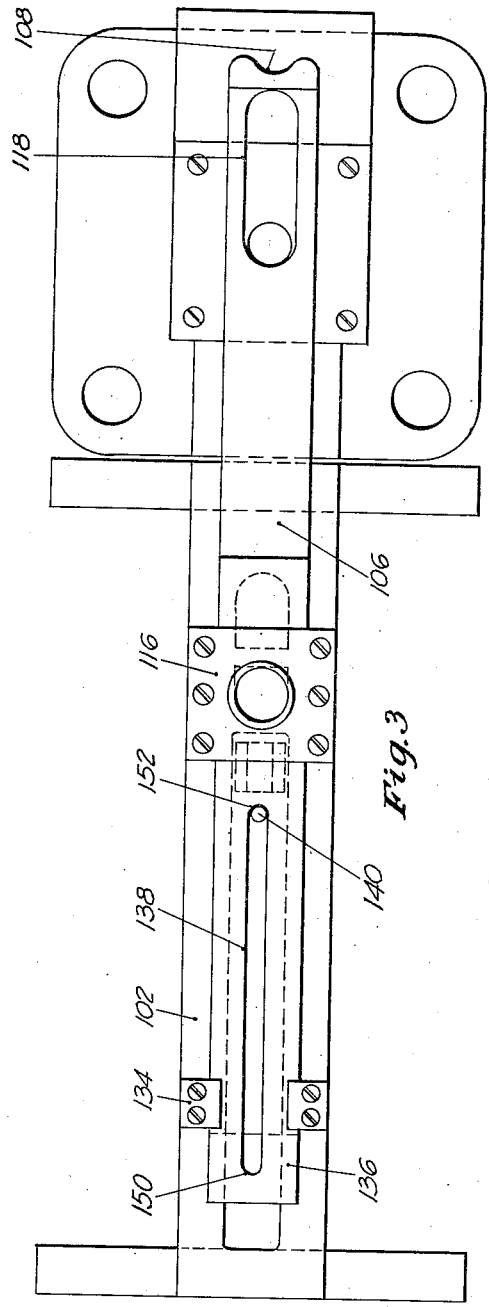
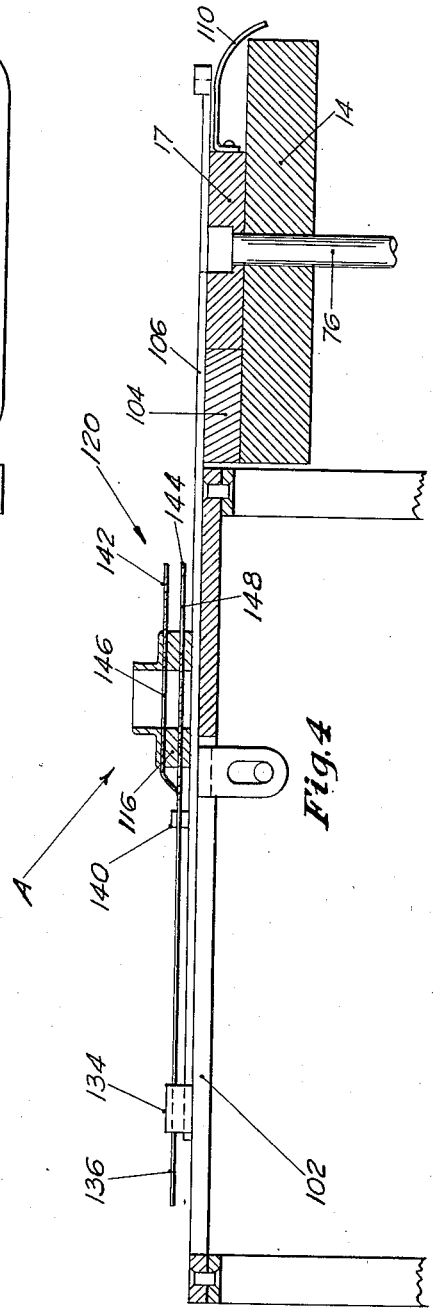
INVENTOR
Gothfried C. Gunderson
BY
ATTORNEY Patented Mar. 7, 1939

2,150,097

UNITED STATES PATENT OFFICE 2,150,097

AUTOMATIC MOLDING APPARATUS

Gothfried C. Gunderson, Perth Amboy, N. J., assignor to Bakelite Corporation, New York, N. Y., a corporation of Delaware Application February 21, 1935, Serial No. 7,492

4 Claims. (Cl. 18—16)

This invention relates to a method and machine for molding plastic materials and more particularly to a machine which is entirely automatic in its operation so that a quantity of preforms or tablets of the molding material may be placed in a magazine on or in conjunction with the machine, after which the machine automatically loads the preforms or tablets into the molding cavity, molds the tablets into the desired shape or a finished piece, giving the correct and desired amount of heat and pressure treatment, and then ejects the finished and molded piece.

With the above in mind, the general object of the invention is to improve automatic molding methods and machines.

A further object of the invention is a positively acting and timed machine.

Another object of the invention is an automatic machine of the above type which molds against a yielding pressure and is particularly adapted for use with thermoplastic or heat hardening molding materials.

Still another object of the invention is a machine of the above type in which an accurate and easily determined molding pressure may be maintained.

A more particular object of the invention is a machine of the above type having a plural part mold, one or more parts being positively actuated for correct timing and to give the correct molding pressure.

Another object of the invention is a simplified mechanism for automatically feeding material to be molded and ejecting molded pieces from the machine, and correlating and timing the mechanisms with the other operations, particularly the molding cycle.

Other and further objects and features of the invention will more fully appear from a consideration of the following description together with the claims and accompanying drawings. These, however, should be taken as disclosing merely an operative and illustrative form of the invention which is not to be limited thereto.

In said drawings,

Fig. 3 is a plan view of the feeding and ejecting mechanism.

Fig. 4 is a side view of the mechanism shown in Fig. 3.

Figure 1:
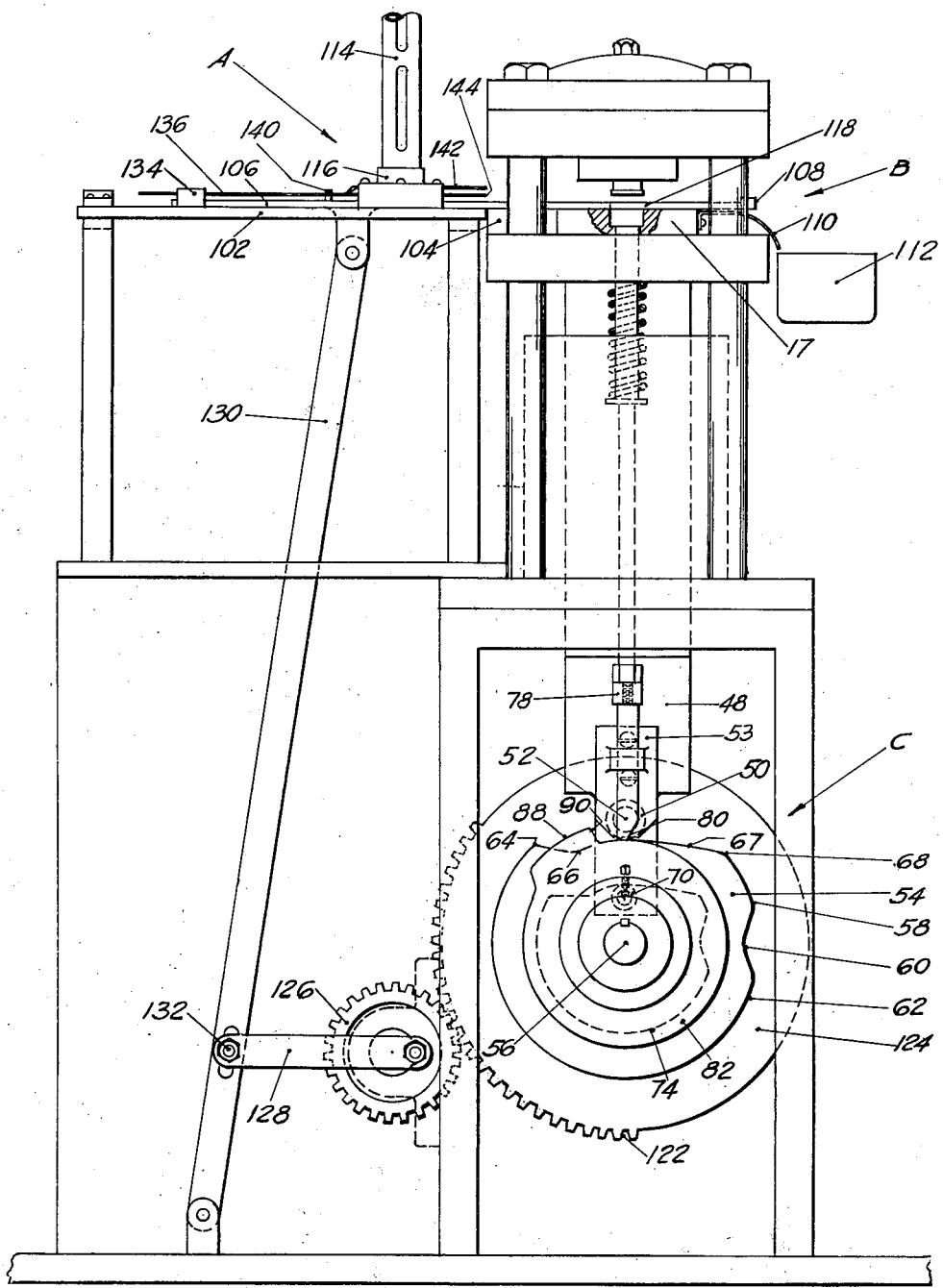
Fig. 1 is a side view of the machine, partly in section.
Figure 2:
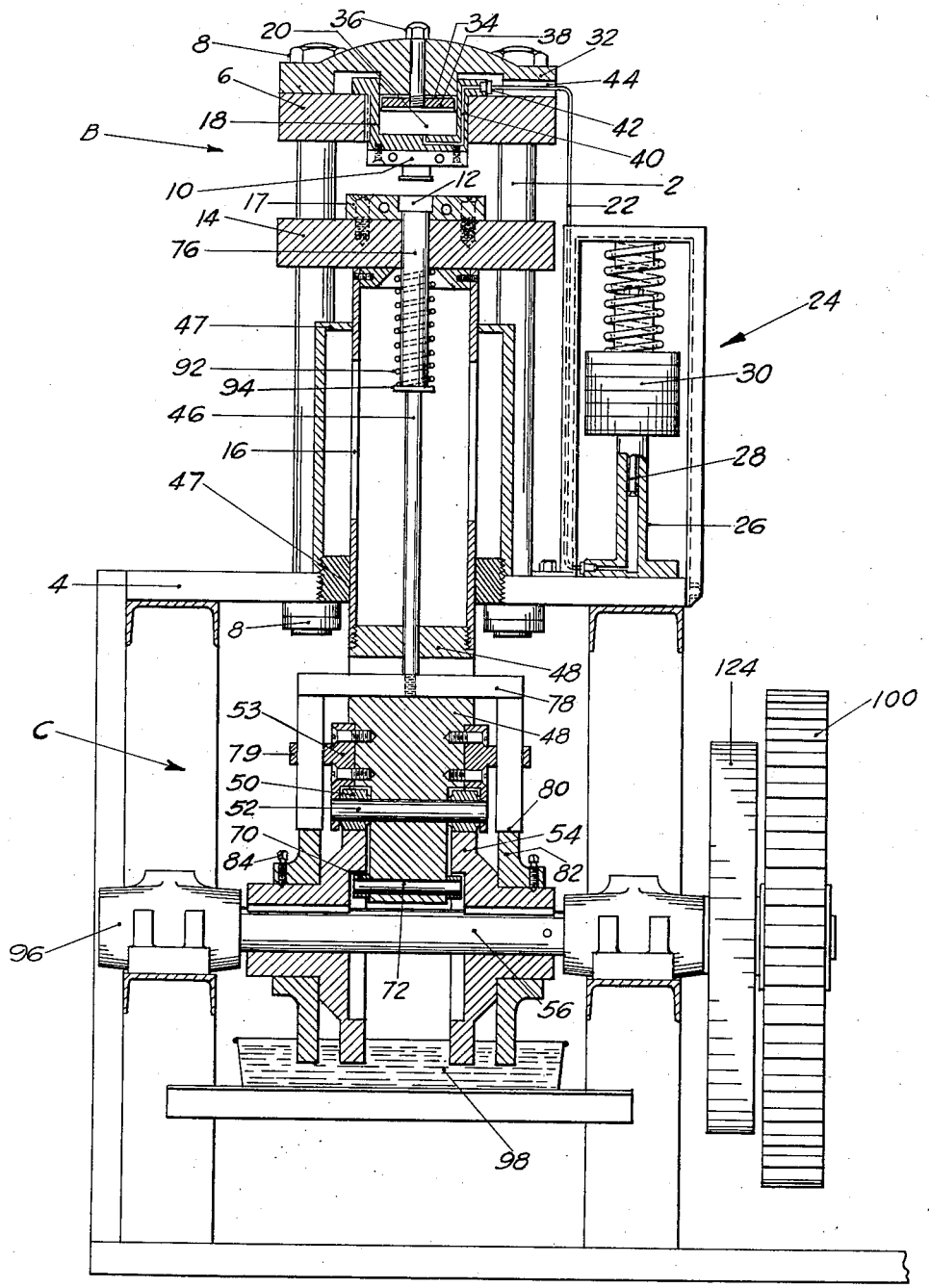
Fig. 2 is an end view of the machine, partly in section.

In its broad aspect, the machine includes a mechanism designated generally at A for feeding the preforms or tablets into and removing the molded pieces from a molding head, which is designated generally at B and comprises a mold and ejecting device. The feeding and removing device A and the parts of the mold head B are operated from a timing and operating mechanism designated generally at C. In the following more detailed description of the machine, the operation of the mold will first be described, thereafter the ejecting mechanism and then the feeding mechanism.

The molding head B is mounted on standards 2 which are supported on a suitable base 4. One member of the head, here illustrated as the upper member 6, is fixed to the standards 2 in any suitable manner. Nuts 8 may be used, firmly to secure the head to the standards 2 and to secure the standards to the base 4. This upper portion 6 of the head carries one part 10 of a plural-part mold or die. The lower part 12 of the mold or die is carried on a movable part 14 of the head, said part 14 being supported and moved by any suitable movable supporting member 16 which in turn, is operated by mechanism within the timing and operating mechanism C. The die plate 17 may be fastened to the part 14 in any suitable manner, for instance, by screws, in order to be detachable so that different dies may be substituted.

By means later to be described in more detail, a preform blank or tablet is fed into the mold cavity 12 after which the member 14 and the mold part 12 move upwardly against the part 10 of the mold. The mold remains closed for the desired period after which the member 14 moves downwardly, and the molded article is ejected from the cavity 12 whereupon it is automatically removed from the molding head.

One of the features of the invention is that the molding material may automatically be subjected to a constant and uniform pressure during molding. One form of mechanism and arrangement of parts for accomplishing this is illustrated in connection with the head of the molding machine. The upper part 10 of the mold is carried by a movable member 18, the two being preferably detachably connected for instance by screws, so that different mold parts 10 may be used. Both of the die parts 10 and 17 preferably contain any desired number and arrangement of passages to permit the use of electric heaters, air, steam, water, oil or other suitable means for heating or cooling the die parts as well as thermometers, thermocouples or other temperature recording and regulating instruments.

In conjunction with the movable member 18 there is a yielding pressure-means forcing the member 18 and die member 10 toward the other part of the mold but yet permitting the members 10 and 18 to yield if necessary when the other part of the die or mold moves against them. Such yielding pressure-means is here illustrated as a chamber 20 which is connected by a force transmitting device or pipe line 22 to a pressure or force exerting device 24. This force exerting device may conveniently be a fluid-containing accumulator and pressure cylinder 26 in which a plunger 28 may move to retain the fluid under pressure. The pressure on the plunger 28 and consequently upon the fluid in the chamber 20 is maintained in any suitable manner for instance by the weights 30. Weights are preferred to springs for exerting pressure, as the pressure may easily be regulated by adding or subtracting weights and weights provide a constant pressure, the amount of which is easily determined. Springs on the other hand, give an increasing pressure as they are compressed. If desired, however, springs may be substituted for weights or used in conjunction therewith, as illustrated, to provide a higher pressure when the mold is closed than when it is closing.

For convenience in manufacturing the parts and the assembly thereof, the upper part of the head comprises a cap plate 32 so made that it permits the required amount of movement of the member 18 and also permits the convenient assembly of a washer 34, for instance by means of a bolt 36 and washer plate 38. The force transmitting fluid may enter or leave the chamber 20 in any suitable manner for instance by the passage 40 through the member 18, a connection being made at 42 with the pipe 22 which enters the molding head through an opening 44 large enough to permit movement of the pipe with the member 18. By this arrangement of parts, the material within the mold is held under a yielding pressure which may be constant or variable as desired. The force of the weights or springs may be applied directly to the mold part 10 if desired.

The movable part 14 of the head and mechanism for operating it will now be described. The part 14 is slidable along and guided by the standards 2. The supporting member 16 may have any suitable form but is preferably hollow so that the ejecting mechanism 46 may be centered within it. Guides 47 guide the member 16 and center it in the machine. For ruggedness of construction, the tubular upper portion of the member 16 is connected to a base 48 which, through friction reducing rollers 50 mounted on a shaft 52 and held in place in any suitable manner for instance by end plates 53 and screws, bears against and is actuated by a cam or cams 54. The cams are splined or otherwise connected to a shaft 56 which is rotated by a prime mover of any suitable type, preferably of variable speed. The contour of the cam 54 is shown in Fig. 1 and is preferably so designed that as the cam rotates the mold is closed when the surface 58 bears against the rollers 50, then as the cam continues its rotation, pressure on the mold is released somewhat and then reapplied to "bump" the mold as the rollers follow the depression 60, then the mold is entirely closed again as the rollers 50 follow the surface 62, after which the mold is opened as the rollers 50 follow the surface of the cam from the point 64 to approximately the point 66. The mold remains open as the rollers follow the cam surface from 66 to 67 and then closes between 67 and 68.

The throw of the cam is preferably such that when the mold is completely closed upon the molding material, the member 18 is raised at least slightly, so that the desired molding pressure as determined by the weights 30 or springs, or both, is exerted on the material. By a suitable design of cam surface when taken in conjunction with the speed of rotation of the cam, any desired combination of timing and duration of closing, breathing and opening of the mold may be effected.

Means are also preferably provided for insuring the positive opening of the mold. As illustrated on the drawings such means may conveniently be friction reducing rollers 70 mounted on a shaft 72 which passes through a portion of the base 48 of the supporting member 16, said rollers 70 following a cam surface 74 which may conveniently be an internal cam formed within the cam member 54. Thus the internal and external cam surfaces of the cam member 54 provide for the positive closing and opening of the mold, thereby preventing the parts of the mold from sticking together. The contour of the cam surface 74 cooperates with that of cam 54 so that surface 74 does not interfere with the action of cam 54 in closing the mold and cam 54 does not interfere with cam 74 in opening the mold for bumping the mold, loading the preform or ejecting the molded piece.

The ejecting mechanism will now be described. At the base of the mold cavity 12 is a plunger 76 which may be moved by the rod 46 to eject the molded pieces from the mold cavity. The ejector 76 is freely movable through and guided by the movable part 14 of the head and the rod 46 is likewise freely movable through and guided by the upper part of the base 48 of the member 16. The rod 46 of the ejector is connected to a yoke or other suitable member 78, the side arms of which may be guided by guides 79 on the plates 53 and the lower ends 80 of which bear upon a cam or cams 82 rotated by the shaft 56. For convenience in manufacture, assembly and adjustment, the cams 82 may be fastened by screws or other suitable means 84 to the body of the cam or cams 54. The surface of the cam 82 is so designed, as is shown in Fig. 1, that during the periods of the molding cycle when the mold is closed, as well as when the mold is open for the purpose of inserting a preform or tablet of molding material, the base of the ejector rod 46 and yoke 78 rest upon and are moved with and carried by the base 48 of the means for supporting the movable member 14 of the head, but as the movable member 14 is withdrawn and the mold is opened to eject the molded piece, the end 80 of the yoke rides along the surface 88 and then moves downwardly along the surface 90, being urged downwardly by the spring 92 which bears at one end against the member 14 and at the other end against the collar 94. Explaining the conjoint action of the cams for moving the member 14 and the ejector 76 and referring particularly to Fig. 1, it will be seen that as the mold-controlling cam roller 50 passes over the point 64 and moves downwardly to the surface 66 of the cam (which action opens the mold), the ends 80 of the yoke 78 ride on the surface 88 of the cam 82 with the result that as the mold cavity 12 moves downwardly to open the mold the ejector 76 rises relatively through the mold cavity to force the molded piece upwardly and out of the mold cavity. As the end 80 of the yoke 78 continues to ride along the surface 88, the molded piece is held in the elevated position so that it can readily be removed from the molding head (by feeding and removal mechanism later described). The said end 80 then follows the surface 90 so that the top of the ejector again seats within the bottom of the mold cavity 12. In the preferred arrangement of the cam surface, the height of the surface 88 of the ejector cam above the normal surface of the cam is equal to or very slightly greater than the depth of the mold cavity 12 so that the ejector 76 raises the molded piece to the top of the mold cavity.

The shaft 56 may conveniently be mounted in bearings 96 which are preferably easily removable to permit other cams to be mounted on the shaft 56. The other cams may have different throws and thus give different amounts of movement of the die plate 17 to accommodate tablets or molded articles of different thicknesses. For lubrication, the cams may dip in an oil bath 98. The shaft 56 is rotated by any suitable prime mover, for instance an electric motor (not shown) which drives the gear 100. It is highly desirable that the prime mover be capable of running at variable speeds so that the duration of the molding cycle, particularly the length of time that the molding material is subjected to heat (or cold) and pressure may be changed easily and at will.

The feeding and delivery mechanism will now be described. A feeding table 102 is mounted beside the head of the mold and on such a level that a tablet or preform of molding material may easily be slid from the table 102 onto the die plate 17 over a bridging plate 104 which may, if desired, be a part of the die plate. A reciprocating plate 106 slides along the table 102, over the bridging plate 104 and through the open mold, the movement of the plate 106 being so timed that its forward end 108, which is formed to receive the molded piece, slides into the open mold when the ejector 76 is holding the molded piece on the level of the die plate 17, and pushes the molded piece over a lip 110 from which it falls into a basket 112.

The reciprocating plate 106 not only delivers the molded piece from the molding head but also feeds to the mold, tablets or preforms of molding material. In order to perform this operation, a stack of preforms or tablets of molding material is placed within the magazine 114 which may have openings along its sides to indicate the number of tablets. The reciprocating plate 106 slides through the base 116 of the magazine 114 and is provided with an opening 118 so positioned that as the plate 106 reciprocates, the opening 118 passes under the stack of tablets, receives a tablet from the stack and then moves it into the molding head where the tablet drops into the mold cavity 12. The timing of the movement of the reciprocating plate 106 is correlated with the movement of the ejector 76 so that between the time that the forward end 108 of the reciprocating plate has pushed the molded piece to such a position that it cannot fall back into the mold cavity 12 and the time that the tablet approaches the edge of the mold cavity, the ejector 76 has seated in the bottom of the mold cavity. The reciprocating plate 106 may, if desired, be provided with a measuring feeder denoted generally at 120 to support the tablets of molding material in the stack and to deliver the required number of tablets (usually only one) into the opening 118.

The reciprocating plate 106 may be moved and timed in any suitable manner. As illustrated herein, a toothed sector 122 on the wheel 124 which is fastened to the shaft 56, meshes with a gear 126 which, in rotating, operates a link 128 and arm 130 to reciprocate the plate 106. The movement of the plate may be changed by an adjustable connection 132 between the link 128 and arm 130 and the plate may be guided by guide 134 on the table 102 in addition to the guiding effect of the base 116 of the feeding device.

The measuring feeder 120 is designed primarily to measure the number of tablets or preforms delivered to the reciprocating plate 106 and to support the weight of the stack of preforms to prevent abrading action as the reciprocating plate 106 slides under the stack. The measuring feeder thus comprises a plate 136 having a longitudinal slot 138 through which projects a pin 140 which is fast to the plate 106. The plate 136 is connected with an upper feed plate 142 and a lower feed plate 144 having non-registering openings 146 and 148 respectively. The operation of this mechanism is that as the plate 106 moves out of the open die, plate 136 remains stationary with the weight of the stack of preforms resting on plate 144. Toward the end of travel of the plate 106, the pin 140 contacts with the end 150 of the slot 138 and carries plate 136 along with plate 106. This movement causes the upper feed plate 142 to close off the bottom of the magazine 114 and support the weight of the stack of tablets. This movement also brings the opening 148 in such a position that the tablet or tablets which were in the space between the plates 142 and 144 are permitted to drop into the opening 118 in the reciprocating plate 106. On the next stroke of the plate 106, the tablets in the opening 118 are moved from the feeding device into the mold cavity 12 but the plate 136 remains stationary until the pin 140 contacts with the end 152 of the slot 138 whereupon the plate 144 closes the bottom of the magazine and the opening 146 permits the tablets to move downwardly until the bottom tablet rests on the plate 144. This feeding device is particularly useful where the tablets or preforms are of soft material and there is a possibility of some of the molding material being ground off thus changing the weight of the tablet fed into the mold cavity, if the plate 106 slides in contact with a bottom tablet which is supporting the full weight of the stack in the feeding magazine. The feeder is also useful where a plurality of small pills or tablets are to be fed into the mold cavity.

The sequence of operations of the machine will now be rehearsed. Assuming that the mold is open and a tablet of molding material has been dropped into the mold cavity 12, the toothed sector 122 and gear 126 operate arm 130 to withdraw the reciprocating plate 106 from the mold head. Cam 54 then raises the lower part of the mold against the upper part 10 of the mold and the movable member 18 yields but exerts the desired pressure (determined by the weights 30 or the springs) on the molding material. As the cam 54 continues to rotate, the depression 60 opens the mold slightly to "bump" the mold. The opening of the mold for bumping is a positive movement as the lower rollers 70 operating against the internal cam surface 74 overcomes any tendency of the parts to stick. As the cam 54 continues to rotate, the surface 62 again closes the mold and holds it closed for a sufficient period of time to permit the molding material to harden; the duration of the hardening period being determined by the length of the cam surface 62 and the speed of rotation of the cam.

The mold is then positively opened by the rollers 50 riding over the points 64 of the cam 54 and any tendency to stick is overcome by the rollers 70 following the internal cam surface 74. When the mold opens, the ejector 76 rises relatively through the mold cavity 12 due to the ends 80 of the ejector yoke riding on the surface 88 of the cam 82. In other words as the die plate 17 is lowered the ejector holds the molded piece on the level of the top of the die plate 17 while the ends 80 of the cam yoke ride on the surface 88 of the cam 82. When the mold is opened, the toothed sector 122 engages the gear 126 to operate the arm 130 and move the end 108 of the plate 106 into the mold head where the end 108 of the plate pushes the molded piece off of the raised ejector, whereupon the ends 80 of the yoke move down the inclined surface 90 of the cam 82 to permit the spring 82 to seat the ejector in the bottom of the mold cavity. The lower part of the mold and the ejector retain their retracted positions while the plate 106 continues its forward movement, the end 108 pushing the molded piece out of the mold head into the basket 112 and the opening 118 bringing forward another tablet of molding material and dropping it into the mold cavity 12. The reciprocating plate is thereupon retracted, the mold is closed and the cycle is repeated.

From the previous description of the machine, it will be seen that the operation is entirely automatic and all that is required of an operator is to load the magazine 114 from time to time as the molding material is used. All parts of the machine are positively actuated so that all tendency of the parts to stick is overcome yet the piece is molded under the desired pressure which may evenly and constantly be applied even though the parts are positively actuated. It is realized that the cam actions may be changed in any desired manner to effect different molding cycles and that mechanical devices other than cams may be used in the machine; also that other material measuring and delivering and piece removing means may be used. The mold also may have more than the two parts illustrated, the parts and functions of the machine may be combined or integrated, loose powdered molding material may be measured and delivered to the mold instead of tablets, etc. Recognizing that these and other changes may be made, it is therefore desired that the invention may be construed including equivalents and as broadly as the following claims taken in conjunction with the prior art may allow.

1. An automatic molding machine comprising a plural part mold having a mold cavity, one of said parts having a relatively large movement to open and close the mold, means for positively moving said part to open and close said mold, and another of said parts having a relatively small movement and yielding means opposing the movement of the other part to compress the molding material to shape in the mold with a regulated yielding pressure, an ejector positively actuated and operable through the positively actuated part of the mold in timed relation with the separation of the mold parts to move the inner surface of the molded piece to a position substantially flush with the outer face of the mold, and piece-removing means movable across the face of the mold in timed relation with the opening of the mold and the operation of the ejector to remove the molded piece from the open mold; the parts of the mold, the ejector and piece-removing means acting automatically and independently of any supervisory act on the part of an attendant.

2. An automatic molding machine comprising a plural part mold having a mold cavity, one of said parts having a relatively large movement to open and close the mold, means for positively moving said part to open and close the mold, and another of said parts having a relatively small movement and yielding means opposing the movement of the other part to compress the molding material to shape in the mold with a regulated yielding hydraulic pressure, an ejector positively actuated and operable through the positively actuated part of the mold in timed relation with the separation of the mold parts to move the inner surface of the molded piece to a position substantially flush with the outer face of the mold, and piece-removing means movable across the face of the mold in timed relation with the opening of the mold and the operation of the ejector to remove the molded piece from the open mold; the parts of the mold, the ejector and piece-removing means acting automatically and independently of any supervisory act on the part of an attendant.

3. An automatic molding machine comprising a plural part mold having a mold cavity, one of said parts having a relatively large movement to open and close the mold, means for positively moving said part to open and close the mold, and another of said parts having a relatively small movement and yielding means opposing the movement of the other part to compress the molding material to shape in the mold with a regulated yielding constant pressure, an ejector positively actuated and operable through the positively actuated part of the mold in timed relation with the separation of the mold parts to move the inner surface of the molded piece to a position substantially flush with the outer face of the mold, and piece-removing means movable across the face of the mold in timed relation with the opening of the mold and the operation of the ejector to remove the molded piece from the open mold; the parts of the mold, the ejector and piece-removing means acting automatically and independently of any supervisory act on the part of an attendant.

4. An automatic molding machine comprising a plural part mold having a mold cavity, one of said parts having a relatively large movement to open and close the mold, means for positively moving said part to open and close the mold, and another of said parts having a relatively small movement and yielding means opposing the movement of the other part to compress the molding material to shape in the mold with a regulated yielding pressure, an ejector positively actuated and operable through the positively actuated part of the mold in timed relation with the separation of the mold parts to move the inner surface of the molded piece to a position substantially flush with the outer face of the mold and later retract, and combined piece-removing and material delivering means movable across the face of the mold in timed relation with the opening of the mold and the operation of the ejector to remove the molded piece from the open mold and deliver material to the mold after the ejector has retracted; the parts of the mold, the ejector and piece-removing means acting automatically and independently of any supervisory act on the part of an attendant.

GOTHFRIED C. GUNDERSON.